United States Patent
Chassagnon et al.

(10) Patent No.: US 7,987,881 B2
(45) Date of Patent: Aug. 2, 2011

(54) TREAD COMPRISING RELIEF ELEMENTS COVERED BY A SPECIFIC MIXTURE

(75) Inventors: Robert Chassagnon, Riom (FR); Didier Vasseur, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 917 days.

(21) Appl. No.: 10/578,132

(22) PCT Filed: Oct. 29, 2004

(86) PCT No.: PCT/EP2004/012238
§ 371 (c)(1),
(2), (4) Date: May 1, 2006

(87) PCT Pub. No.: WO2005/044593
PCT Pub. Date: May 19, 2005

(65) Prior Publication Data
US 2007/0062623 A1    Mar. 22, 2007

(30) Foreign Application Priority Data
Oct. 30, 2003   (FR) .................................... 03 12742

(51) Int. Cl.
*B60C 1/00* (2006.01)
*B60C 11/00* (2006.01)
(52) U.S. Cl. .............. 152/209.5; 152/209.18; 152/905
(58) Field of Classification Search .............. 152/209.1, 152/209.5, 905, 209.18
See application file for complete search history.

(56) References Cited

U.S. PATENT DOCUMENTS

| 5,252,649 | A | * | 10/1993 | Hausmann | 524/313 |
| 5,840,137 | A |   | 11/1998 | Futamura | |
| 6,035,911 | A | * | 3/2000 | Matsumoto et al. | 152/209.5 |
| 7,335,692 | B2 | * | 2/2008 | Vasseur et al. | 524/313 |
| 2001/0009948 | A1 | * | 7/2001 | Hopkins et al. | 525/330.7 |
| 2005/0109436 | A1 | * | 5/2005 | Bruant et al. | 152/209.1 |

(Continued)

FOREIGN PATENT DOCUMENTS
DE     1 194 721 B    6/1965
(Continued)

*Primary Examiner* — Steven D Maki
(74) *Attorney, Agent, or Firm* — Cohen Pontani Lieberman & Pavane LLP

(57) ABSTRACT

A tire tread comprising a plurality of elements in relief (1) comprising a contact face (2) intended to come into contact with the roadway during travel and lateral faces (13, 14, 15, 16), the intersection of each lateral face with the contact face forming a ridge (23, 24, 25, 26). The tire tread also comprises a plurality of cutouts (3, 4) in the form of grooves and/or incisions, said cutouts being defined by facing main faces. Each tread pattern element (1) is formed with at least one rubber mix (referred to as "base mix"). This tread, viewed in section in a plane containing the thickness of this tread, has at least one face defining at least one cutout covered at least in part with a second rubber mix, referred to as "covering mix", this part having covering mix extending when new over a height Hr at least equal to 30% of the height H of the face, and wherein at least one first base mix opens on to the contact face when new or at the latest after wear at most equal to 10% of the height Hr. The covering mix comprises a butyl rubber and the covering mix comprises a plasticiser of the type unsaturated $C_{12}$-$C_{22}$ fatty acid ester.

11 Claims, 1 Drawing Sheet

U.S. PATENT DOCUMENTS

2007/0082991 A1 * 4/2007 Chassagnon et al. ......... 524/313

FOREIGN PATENT DOCUMENTS

| EP | 0 510 550 A1 | | 4/1992 |
| --- | --- | --- | --- |
| EP | 0 837 096 A | | 4/1998 |
| EP | 1 228 902 A | | 8/2000 |
| EP | 1 228 898 A | | 8/2002 |
| JP | 58-033504 | * | 2/1983 |
| JP | 58 033504 A | | 2/1983 |
| JP | 63-039935 | * | 2/1988 |
| JP | 02 045202 A | | 2/1990 |
| JP | 09-099712 | * | 4/1997 |
| JP | 2000-153701 | * | 6/2000 |
| JP | 2002-275311 | * | 9/2002 |
| WO | 02/088238 | * | 11/2002 |

* cited by examiner

TREAD COMPRISING RELIEF ELEMENTS COVERED BY A SPECIFIC MIXTURE

RELATED APPLICATION

This is a U.S. National Phase Application under 35 USC 371 of International Application PCT/EP2004/012238, filed on Oct. 29, 2004.

FIELD OF THE INVENTION

The invention relates to tires and more particularly to the treads of such tires.

BACKGROUND OF THE INVENTION

In order to obtain satisfactory performance during travel in particular on wet roads, it is known to provide a tread of a tire with a tread pattern formed by tread pattern elements which are separated from each other by cutouts (grooves of average width greater than or equal to 2.5 mm and/or incisions of average width less than 2.5 mm), these cutouts being obtained for example by moulding. The tread pattern elements thus formed comprise a contact face intended to come into contact with the roadway during travel and lateral faces also defining the cutouts; the intersection of each lateral face with the contact face forms a ridge which facilitates the contact of the tire with the roadway, and in particular when the latter is wet. More generally, a ridge is defined as the geometric limit of contact of a tread pattern element with the ground during travel.

Among tread pattern elements, a distinction is made between elements which do not run right around the tire (blocks) and elements which do run right around it (ribs). Furthermore, the tread pattern elements may comprise one or more incisions to form additional ridges, when each incision may or may not open on to at least one lateral face of the tread pattern element. By definition, an incision is the space defined by two main facing faces distant from each other by a width of less than 2.5 mm.

In improving the grip of the tire on a damp road, it is known that the very nature of the rubber mix (alternatively referred to as "rubber composition") forming the tread has a significant effect. Thus, a tread of a tire made of rubber mix having a better grip on wet ground makes it possible to obtain improved performance during travel in wet ground conditions. However, in parallel to this improvement in grip performance on wet ground, as a general rule a loss of wear performance on a dry road occurs, which results in a reduced wear life and necessitates more frequent changing of the tires on a vehicle.

Consequently, there is a need for a tire the tread of which retains good wear life performance while substantially improving the grip performance on wet ground.

SUMMARY OF THE INVENTION

One aspect of the present invention comprises a plurality of elements in relief (ribs and/or blocks) having at least one lateral face and one contact face intended to be in contact along a surface of contact with the roadway during travel of a tire provided with the tread, the limit of the surface of contact of the contact face with the ground forming at least one ridge. A a plurality of cutouts is in the form of grooves and/or incisions, said cutouts being defined by facing lateral faces. Each tread pattern element is formed mainly with at least one first rubber mix (referred to as "base mix") This tread, viewed in section in a plane containing the thickness of this tread, at least one face of height H defining at least one cutout is covered at least in part with a second rubber mix, referred to as "covering mix". This part consisting of This part has covering mix extending over a height Hr at least equal to 30% of the height H of the face, at least one base mix opens on to the contact face when new or at the latest after wear at most equal to 10% of the height Hr. The covering mix includes a butyl rubber, and the covering mix comprises as plasticising agent a compound of unsaturated $C_{12}$-$C_{22}$ fatty acid ester type.

Preferably, the covering mix comprises, as plasticising agent, a compound of the unsaturated $C_{12}$-$C_{22}$ fatty acid ester type, in an amount of, for example, between 5 and 80 phr, in particular between 10 and 50 phr, dependent on the particular covering mix in question, in particular on the amount of inorganic filler therein. It has been noted that this combination made it possible to achieve good grip performance during travel on damp ground with a tire provided with a tread according to the invention.

The rubber composition constituting the covering mix has the characteristic of comprising a butyl rubber. "Butyl rubber" is understood in known manner to mean a copolymer of isobutylene and isoprene (abbreviated to IIR), and also the halogenated, in particular chlorinated or brominated, versions of this type of copolymer.

It has been noted, surprisingly, that the presence of butyl rubber in the covering mix on the faces limiting the cutouts (that is to say the lateral faces of one or more elements in relief of the tread) resulted in a very significant increase in the overall grip on wet roads of a tread, without for all that notably adversely affecting the wear resistance of the latter, which is provided essentially by the base mix.

For this reason, the covering mix comprises more than 15 phr (parts by weight per hundred parts of elastomer), and more preferably still more than 30 phr, of butyl rubber. The butyl rubber may constitute the majority diene elastomer of the covering mix, for example be present in an amount of 50 to 100 phr. The person skilled in the art will be able to adjust this amount of butyl rubber, in the light of the present description, as a function of the specific embodiment of the invention and in particular of the type of tire in question.

The rubber composition forming the covering mix may comprise, in addition to the butyl rubber, another diene elastomer as defined hereafter for the base mix.

"Diene" elastomer (or rubber) is understood to mean, in known manner, an elastomer resulting at least in part (i.e. a homopolymer or a copolymer) from diene monomers (monomers bearing two double carbon-carbon bonds, whether conjugated or not). These diene elastomers may be classed in two categories: "essentially unsaturated" or "essentially saturated".

Generally "essentially unsaturated" is understood to mean a diene elastomer resulting at least in part from conjugated diene monomers, having a content of members or units of diene origin (conjugated dienes) which is greater than 15% (mole percent). Thus, for example, butyl rubbers or copolymers of dienes and of alpha-olefins of the EPDM type do not fall within the preceding definition, and may be described as "essentially saturated" diene elastomers (low or very low content of units of diene origin which is always less than 15%). Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the base mix (and if applicable in the covering mix in addition to the butyl rubber):

(a) any homopolymer obtained by polymerisation of a conjugated diene monomer having 4 to 12 carbon atoms;
(b) any copolymer obtained by copolymerisation of one or more conjugated dienes together or with one or more vinyl-aromatic compounds having 8 to 20 carbon atoms;
(c) a ternary copolymer obtained by copolymerisation of ethylene, of an α-oléfin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene.

According to a preferred embodiment of the invention, the diene elastomer other than butyl rubber is selected from the group consisting of polybutadienes (BR), polyisoprenes (IR), natural rubber (NR), butadiene copolymers, isoprene copolymers and mixtures of these elastomers. Such copolymers are more preferably selected from the group which consists of butadiene/styrene copolymers (SBR), isoprene/butadiene copolymers (BIR), isoprene/styrene copolymers (SIR) and isoprene/butadiene/styrene copolymers (SBIR).

In particular, when the tread is for example intended for a tire for a vehicle of passenger-vehicle type, the diene elastomer of the base mix is majoritarily (that is to say to more than 50 phr) an SBR, be it an SBR prepared in emulsion ("ESBR") or an SBR prepared in solution ("SSBR"), or a blend (mixture) of SBR/BR, SBR/NR (or SBR/IR), or alternatively BR/NR (or BR/IR). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg (glass transition temperature measured in accordance with ASTM D3418-82) of between −20° C. and −55° C. is used; such an SBR may advantageously be used in a mixture with a BR having preferably more than 90% cis-1,4 bonds.

According to another particularly preferred embodiment, the diene elastomer other than butyl rubber is majoritarily (to more than 50 phr) an isoprene elastomer, in particular when the tread of the invention is intended for a tire for an industrial vehicle such as a heavy vehicle. "Isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isoprene/styrene copolymers (SIR), isoprene/butadiene copolymers (BIR) or isoprene/butadiene/styrene copolymers (SBIR). In particular, this isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used.

Of course, the base mix could also comprise a minority fraction of butyl rubber. However, and preferably, the base mix is devoid of butyl rubber.

The base mix and covering mix on the other hand comprise a reinforcing filler, for example carbon black or a reinforcing inorganic filler with which is then associated a coupling agent, the total amount of reinforcing filler being for example of between 30 and 150 phr, preferably between 40 and 130 phr.

Suitable carbon blacks are all the carbon blacks, in particular the blacks of the type HAF, ISAF and SAF, which are known to the person skilled in the art and conventionally used in tire treads, for example the reinforcing carbon blacks of series 100, 200 or 300 (ASTM grades) typically used in the treads of these tires (for example N115, N134, N234, N326, N330, N339, N347 or N375).

According to a particularly preferred embodiment of the invention, the base mix and covering mix both comprise an inorganic filler as reinforcing filler, and also a coupling agent providing in known manner the bond or coupling between the inorganic filler and the elastomer. This reinforcing inorganic filler is preferably a majority filler, that is to say that it represents more than 50% by weight of the total reinforcing filler used in both types of mix.

"Reinforcing inorganic filler" is to be understood here, in known manner, to mean any inorganic or mineral filler, whatever its colour and its origin (natural or synthetic), also referred to as "white" filler or sometimes "clear" filler, in contrast to carbon black, which is capable, on its own, without any other means than an intermediate coupling agent, of reinforcing a rubber composition intended for the manufacture of a tire tread, in other words which is capable of replacing a conventional tire-grade carbon black for treads in its reinforcement function; such a filler is generally characterised, in known manner, by the presence of hydroxyl (—OH) groups at its surface.

Preferably, the reinforcing inorganic filler is a filler of the siliceous type, such as silica ($SiO_2$), for example, or of the aluminous type, such as alumina ($Al_2O_3$). Advantageously any reinforcing silica known to the person skilled in the art, in particular a precipitated silica of the highly dispersible type (referred to as "HD") preferably having a BET specific surface area of between 60 and 350 $m^2/g$, may be used. Preferably, the amount of reinforcing inorganic filler is greater than 50 phr, in particular between 60 and 140 phr, more preferably still within a range from 70 to 130 phr in particular when the tread is intended for a passenger-vehicle tire.

The (inorganic filler/diene elastomer) coupling agents are well-known to the person skilled in the art. Any coupling agent capable of ensuring, in the rubber compositions usable for the manufacture of tire treads, the effective bonding between a reinforcing inorganic filler such as silica and a diene elastomer, in particular organosilanes or polyorganosiloxanes which are at least bifunctional, may be used. By way of example a polysulphide of bis-hydroxysilylpropyl or of bis-($C_1$-$C_4$)alkoxysilylpropyl such as, for example bis(3-triethoxysilylpropyl) tetrasulphide, abbreviated to TESPT, is used. The content of coupling agent is preferably between 4 and 12 phr, more preferably between 3 and 8 phr.

When the base mix (or alternatively the covering mix) comprises a reinforcing inorganic filler, it is preferred to use a small quantity of carbon black, preferably within a range from 5 to 20 phr, more preferably still within a range from 5 to 10 phr; within the ranges indicated, there is a benefit to be had from the specific properties (pigmentation and anti-UV) of the carbon black, without furthermore adversely affecting the typical performance provided by the reinforcing inorganic filler (reduced rolling resistance, improved grip).

In addition to the base constituents previously described, the base mix and covering mix furthermore comprise all or some of the conventional additives used in rubber compositions intended for the manufacture of treads, such as, for example plasticisers or extender oils, whether the latter be of aromatic nature (in particular very slightly aromatic oils of types "MES" or "TDAE") or of non-aromatic nature, pigments, protective agents such as anti-ozone waxes, chemical antiozonants, antioxidants, anti-fatigue agents, reinforcing or plasticising resins, a cross-linking system based either on sulphur, or on sulphur and/or peroxide and/or bismaleimide donors, vulcanisation accelerators and vulcanisation activators. These compositions may also contain, in addition to the coupling agents, coupling activators or covering agents for the reinforcing inorganic filler.

Among the fatty acids above, those which are more preferably selected are the $C_{18}$ acids (oleic acid, linoleic acid, linolenic acid, or a mixture of these acids). The alcohol functions from which such esters derive are furthermore known, and mention will be made of for example butanol, hexanol, octanol, ethylene glycol, diols such as butanediol or triols such as glycerol.

Preferably, the fatty acid used, be it synthetic or natural in origin, is constituted to more than 50% by weight, more preferably still to more than 80% by weight, of oleic acid.

More preferably, triesters of fatty acids, in particular triesters of glycerol, in particular glycerol trioleate derived from oleic acid and glycerol, are used in a preferred amount of between 15 and 30 phr. Among the preferred glycerol trioleates, mention will be made in particular, as examples of natural compounds, of the vegetable oils sunflower oil or rapeseed oil having a high content of oleic acid (containing preferably more than 50%, more preferably more than 80%, by weight of oleic acid).

Hydrocarbon plasticising resins, in particular those described for example in application WO 02/072688, in a quantity preferably within a range from 5 to 35 phr, are also advantageously usable, alone or in combination with the esters described above.

Preferably, the total thickness of covering mix on covered and opposed lateral faces of one and the same element in relief is at most equal to 50% of the average distance between said lateral faces; "opposed lateral faces of one and the same element in relief" is to be understood to mean lateral faces substantially of the same direction.

Preferably, and to have a perceptible effect from the initial state onwards on a new tread, the covering mix of at least one face is arranged starting from the contact face.

Preferably, the thickness of covering mix is greater than 0.1 mm over at least 80% of the height Hr. Preferably, the thickness of covering mix is at least equal to 0.2 mm and at most equal to 3 mm, over at least 80% of the height Hr, and even more advantageously of between 0.2 mm and 2 mm, over at least 80% of the height Hr.

"Average distance between two opposed lateral faces" is understood to mean the average of the distances between said lateral faces, these distances being measured perpendicular to said lateral faces in question.

"Average thickness of covering mix on a face" is understood to mean the average of the maximum and minimum thicknesses of covering mix, it being understood that these thicknesses are measured on the tread in the initial state perpendicular to the face in question.

"Average distance between a cutout (groove, incision) in question and its closest cutout which is substantially parallel thereto" is understood to mean the average of the maximum and minimum distances between said cutouts.

The tread according to the invention surprisingly makes it possible to obtain a good balance between the wear performance on dry ground and the grip performance on wet ground, because although it was known, in order to obtain a tread of high performance on snow-covered ground, to form elements in relief in a first base mix and to cover the lateral faces of these elements with a layer of low thickness in a mixture having an average glass transition temperature Tg less than that of the base mix (see for example U.S. Pat. No. 5,840,137), no document described or suggested the proposed solution.

The covering material may be arranged on facing lateral faces of elements in relief defining one and the same cutout by covering or not covering the bottom of said cutout.

Advantageously, all the lateral faces of the elements in relief defining grooves of circumferential general orientation are provided with a covering mix comprising a butyl rubber (in an amount preferably greater than 15 phr, more preferably greater than 30 phr) in order to improve very substantially the cornering performance (under transverse stresses) on wet ground or ground which has been rendered slippery. Of course, it is possible to use, according for example to the orientation of the grooves of one and the same tread, different covering mixes in combination with a base mix (or even several base mixes); in this case, each covering mix comprises a butyl rubber in the preferred amounts indicated above, and each base mix which is directly adjacent thereto is preferably devoid of butyl rubber.

It is known that for various reasons, and in particular owing to the change in properties of the material with use and over time, the level of grip of the tire on wet ground may decrease gradually, even when the material is initially homogeneous within the thickness of the tread. In order to overcome this disadvantage, it is advantageous, in combination with the provisions of the invention, to provide for the presence of a second base mix which adheres better on wet ground than the first base mix and the arrangement of which within the elements in relief is such that this second mix appears gradually over the width on the contact face of said elements, or more generally appears gradually over the width of the running surface of the tread as this tread becomes worn. According to another advantageous variant, the second mix may be identical to the covering mix.

Another aspect of the present invention is the use of such a tread for the manufacture of new tires or the retreading of worn tires.

Another aspect of the present invention is these tires themselves when they comprise a tread according to the invention.

Other characteristics and advantages of the present invention will become apparent from the description given hereafter with reference to the appended drawings, in which:

DETAILED DESCRIPTION OF THE DRAWINGS

Figure 1:
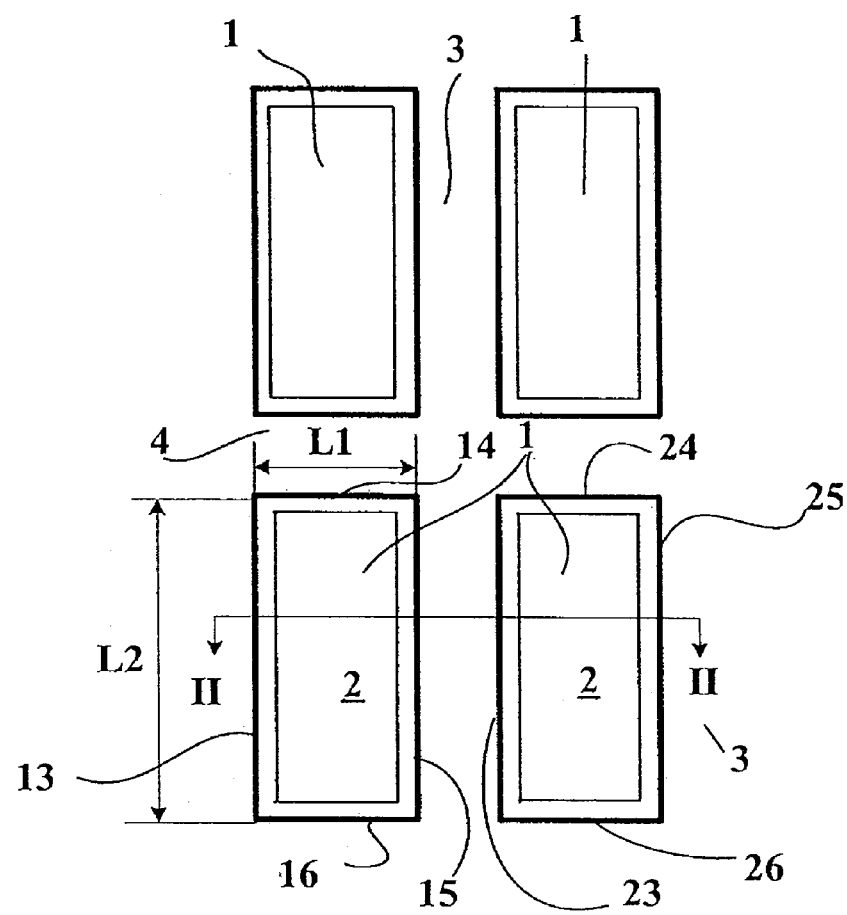
FIG. 1 represents a partial plan view of a block tread pattern of a tread.

In FIG. 1, there can be seen contact faces 2 of blocks 1 of rectangular shape of a tread pattern according to the invention, said blocks 1 being defined by grooves of longitudinal 3 and transverse 4 orientation. Each of these blocks 1 comprises four lateral faces 13, 14, 15, 16, the intersections of which with the contact face 2 form, respectively, ridges 23, 24, 25, 26 which play an important role during travel, and in particular on a roadway which has been rendered slippery (in particular by the presence of water). Each block 1 is rectangular, of width L1 and of length L2 (the direction of the length L1 of the blocks in the case described being the same as the longitudinal direction of the tread or alternatively the circumferential direction on the tire provided with said tread).

The four lateral faces 13, 14, 15, 16 are entirely covered with a thickness E1 (visible in FIG. 2) which is substantially constant (over the entire height Hr of coverage, in the present case equal to the depth H of the grooves) of a covering rubber composition MR different from a rubber composition MB (referred to hereafter as base composition) in that the covering rubber composition MR comprises butyl and in that the base rubber composition MB is devoid thereof.

Figure 2:
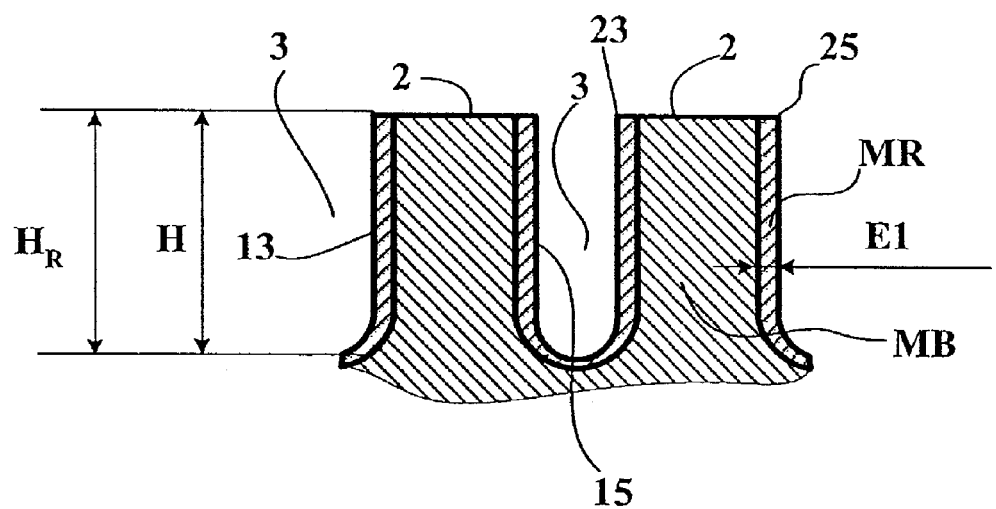
FIG. 2 shows the blocks of FIG. 1 in cross-section along the section line II-II.

On the cross-section shown in FIG. 2 and taken along the line II-II of FIG. 1 and perpendicular to the contact faces 2 of two blocks 1, there can easily be seen the presence at the surface of the covering rubber composition MR on the lateral faces 13 and 15 limiting the grooves of longitudinal orientation 3.

The average thickness E1 of the covering MR of the lateral faces is less than half the total width L1 of the blocks and preferably less than 30% of L1. Preferably, the totals of the thicknesses of the coverings of two opposed lateral faces in the direction of the width (13, 15) and that of the length (14, 16) are respectively less than 50% of the width L1 and than 50% of the length L2.

Although the technical effect of the invention can surprisingly be obtained with low covering thicknesses (for example, less than or equal to 0.1 mm), it is preferable in order to obtain a significant effect which is durable over time, for this average thickness to be at least equal to 0.2 mm in the case of a tread pattern intended for a tread of a passenger-vehicle tire.

The attached table (amounts of the different products expressed in phr) shows two examples of rubber compositions usable, respectively, as base mix MB (composition C-1) and covering mix MR (composition C-2). These are two compositions reinforced majoritarily with silica and comprising a small quantity of carbon black, prepared using conventional techniques well-known to the person skilled in the art which are not described here in order to simplify the description.

The base mix comprises two known SBR and BR diene elastomers, and is conventionally used in what are called "green" tires of low energy consumption. The covering mix comprises 50 phr of butyl rubber with which is associated 50 phr of an SBR of the same structure as the previous one, but devoid of aromatic oil. Composition C-2 has the characteristic of not comprising any aromatic oil, the latter being totally replaced (in an amount of 33 phr) by a fatty acid ester (glycerol trioleate) and an associated hydrocarbon resin.

Compositions C-1 and C-2 previously described were used in treads of radial-carcass passenger-vehicle tires referred to as P-1 and P-2 respectively, of dimension 195/65 R15 (speed index H), which are conventionally manufactured and identical in all points except for the rubber compositions constituting the tread.

Composition C-1 forms all of the tread of the tires P-1 (reference tires) and the base mix of the tread of the tires P-2 according to the invention, whereas composition C-2 constitutes the covering mix of the tires P-2 according to the invention. This covering mix has a thickness of the order of 1.0 mm over at least 80% of the height Hr of all the lateral faces of all the elements in relief of the tread pattern of the tread of the tires P-2. The tires P-2 adopt substantially the structure described with the support of FIGS. 1 and 2.

All the tires were then mounted at the front of an automobile (Renault Laguna—front and rear pressure of 2.0 bar) fitted with an ABS braking system, to be subjected to a braking test on wet roads consisting of measuring the distance necessary to go from 50 km/h to 10 km/h upon sudden braking on wetted ground (asphalt concrete).

Under the conditions listed above, it was noted that the braking distance was reduced by 20% for the vehicle fitted with the tires P-2 according to the invention, compared with the same vehicle fitted with reference tires P-1.

This result is all the more unexpected and surprising since the total surface of covering mix (composition C-2) in contact with the ground measured on an imprint of the tire represents only 20% of the total surface of the tread in contact with the ground.

The thickness E1 of coating mix MR may, as is the case here, be substantially uniform over the entire height of the face H and between 0.2 mm and 3 mm and even more preferably between 0.2 mm and 2 mm for a passenger-car tire.

As a variant, it is possible to cover the lateral faces of the elements in relief with different covering rubber compositions according to the lateral faces in question while maintaining the presence of butyl rubber in said compositions (likewise, the average thicknesses may be different according to the face in question).

One way of obtaining such a tread pattern consists for example of covering a tread blank made from a base mix with a layer of covering mix of appropriate thickness before proceeding to mould the tread and the grooves and incisions. After moulding, the covering mix on the contact face of the rib may be left in place or alternatively be removed by mechanical means (in particular by grinding).

The industrial production of a tread according to the invention may consist of laying, on the non-vulcanised tire blank provided with a tread of non-vulcanised base mix, strips of a mix different from the base mix, as described in patent specification EP 0510550 (the strips may be laid on the tread in the circumferential and/or transverse direction). Another way may consist of producing the tread by co-extruding two mixes (or more) at the time of extrusion of the tread.

The invention applied in what has been described above for a tire tread may also be advantageously applied to other fields such as that of caterpillar tracks or alternatively that of shoes and in particular that of shoes for practising sports.

TABLE

| Composition No. | C-1 (MB) | C-2 (MR) |
| --- | --- | --- |
| SBR (1) | 70 | — |
| BR (2) | 30 | — |
| SBR (3) | — | 50 |
| IIR (4) | — | 50 |
| carbon black (5) | 6 | 6 |
| silica (6) | 80 | 80 |
| coupling agent (7) | 6.4 | 6.4 |
| aromatic oil (8) | 33.0 | — |
| plasticiser (9) | — | 17.0 |
| plasticiser (10) | — | 16.0 |
| DPG (11) | 1.5 | 1.5 |
| ZnO | 2.5 | 2.5 |
| stearic acid | 2 | 2 |
| anti-ozone wax | 1.5 | 1.5 |
| antioxidant (12) | 1.9 | 1.9 |
| sulphur | 1.1 | 1.1 |
| accelerator (13) | 2.0 | 2.0 |

(1) SBR (expressed as dry SBR) extended with 18% by weight (12.6 phr) of oil (or a total of 82.6 phr of extended SBR); 25% styrene, 58% 1,2-polybutadiene units and 23% trans-1,4-polybutadiene units (Tg = −24° C.);
(2) BR with 4.3% of 1–2; 2.7% of trans; 93% of cis 1,4 (Tg = −106° C.);
(3) SBR (dry SBR); 25% styrene, 58% 1,2-polybutadiene units and 23% trans-1,4-polybutadiene units (Tg = −24° C.);
(4) brominated butyl rubber (BIIR - "EB2222" from Exxon);
(5) carbon black N234;
(6) silica "Zeosil 1165 MP" from Rhodia, type "HDS" (BET and CTAB: approximately 160 m²/g);
(7) TESPT coupling agent ("Si69" from Degussa);
(8) total aromatic oil (including extender oil for the SBR);

TABLE-continued

| Composition No. | C-1 (MB) | C-2 (MR) |
|---|---|---|

(9) glycerol trioleate (sunflower oil containing 85% by weight of oleic acid - "Lubrirob Tod 1880" from Novance);
(10) plasticising hydrocarbon resin of high Tg ("R2495" from Hercules);
(11) diphenylguanidine (Perkacit DPG from Flexsys);
(12) N-1,3-dimethylbutyl-N-phenylparaphenylenediamine (Santoflex 6-PPD from Flexsys);
(13) N-cyclohexyl-2-benzothiazyl sulphenamide (Santocure CBS from Flexsys - 1.8 phr) and zinc dibenzyldithiocarbamate (Vulkacit ZBEC from Bayer - 0.2 phr).

The invention claimed is:

1. A rubber tread for a tire, the rubber tread comprising:
a plurality of tread pattern elements comprising lateral faces, one contact face for contact with a roadway during travel of the tire, and at least one ridge defined by a limit of the surface of contact of the contact face with the roadway;
a plurality of cutouts being defined by the lateral faces;
wherein each of the tread pattern elements is formed with at least one base mix and at least one covering mix;
wherein at least one of the lateral faces is covered at least in part with the covering mix having a height Hr at least equal to 30% of a height H of the at least one lateral face before a new tire is used,
wherein the at least one base mix extends to the contact face either before the new tire is used or after wear is up to 10% of the height Hr of the covering mix,
wherein said covering mix comprises more than 30 phr of a butyl rubber and a plasticiser of an unsaturated $C_{12}$-$C_{22}$ fatty acid ester type, and
wherein the at least one base mix is free of an unsaturated $C_{12}$-$C_{22}$ fatty acid ester, and the at least one base mix comprises aromatic oil.

2. The tread according to claim 1, wherein the amount of the fatty acid ester type is between 5 and 80 phr.

3. The tread according to claim 1, wherein the fatty acid ester type is a glycerol trioleate.

4. The tread according to claim 3, wherein the amount of glycerol trioleate is between 15 and 30 phr.

5. The tread according to claim 1, wherein the covering mix comprises from 50 to 100 phr of butyl rubber.

6. The tread according to claim 1, wherein the base mix is devoid of butyl rubber.

7. A tire comprising a tread according to claim 1.

8. The tread according to claim 1, wherein the cutouts are in the form of grooves or incisions.

9. The tread according to claim 1, wherein the amount of the fatty acid ester type is between 10 and 50 phr.

10. The tread according to claim 1, wherein the aromatic oil is a MES or TDAE type of oil.

11. The tread according to claim 1, wherein the covering mix is devoid of aromatic oil.

* * * * *